United States Patent
Yao et al.

(10) Patent No.: US 10,749,180 B2
(45) Date of Patent: Aug. 18, 2020

(54) RECHARGEABLE ALKALINE BATTERY USING ORGANIC MATERIALS AS NEGATIVE ELECTRODES

(71) Applicant: University of Houston System, Houston, TX (US)

(72) Inventors: Yan Yao, Pearland, TX (US); Yanliang Liang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 136 days.

(21) Appl. No.: 16/018,318

(22) Filed: Jun. 26, 2018

(65) Prior Publication Data
US 2018/0301703 A1     Oct. 18, 2018

Related U.S. Application Data

(62) Division of application No. 14/825,802, filed on Aug. 13, 2015, now Pat. No. 10,033,039.

(60) Provisional application No. 62/036,828, filed on Aug. 13, 2014.

(51) Int. Cl.
| | |
|---|---|
| H01M 4/04 | (2006.01) |
| H01M 4/24 | (2006.01) |
| H01M 4/60 | (2006.01) |
| H01M 10/24 | (2006.01) |
| H01M 10/28 | (2006.01) |
| H01M 4/02 | (2006.01) |
| H01M 4/32 | (2006.01) |
| H01M 4/62 | (2006.01) |
| H01M 10/30 | (2006.01) |

(52) U.S. Cl.
CPC ........... *H01M 4/602* (2013.01); *H01M 4/043* (2013.01); *H01M 4/24* (2013.01); *H01M 4/60* (2013.01); *H01M 10/24* (2013.01); *H01M 10/28* (2013.01); *H01M 4/32* (2013.01); *H01M 4/622* (2013.01); *H01M 4/624* (2013.01); *H01M 10/30* (2013.01); *H01M 2004/027* (2013.01)

(58) Field of Classification Search
CPC .......... H01M 4/043; H01M 4/24; H01M 4/32; H01M 4/60; H01M 4/602; H01M 4/622; H01M 4/624; H01M 2004/027; H01M 10/24; H01M 10/28; H01M 10/30
See application file for complete search history.

(56) References Cited

U.S. PATENT DOCUMENTS

| | | | | |
|---|---|---|---|---|
| 6,287,723 | B1 * | 9/2001 | Maeda | H01M 4/621 429/206 |
| 2013/0149614 | A1 * | 6/2013 | Kubo | H01M 2/1626 429/246 |
| 2014/0363746 | A1 * | 12/2014 | He | H01M 10/052 429/406 |

FOREIGN PATENT DOCUMENTS

JP     3045750     *  5/2000

OTHER PUBLICATIONS

English translation of JP Publication 3045750, May 2000.*

* cited by examiner

*Primary Examiner* — Brittany L Raymond
(74) *Attorney, Agent, or Firm* — Winstead PC

(57) ABSTRACT

An energy storage device may provide a positive electrode, an electrolyte, and a negative electrode. The energy storage device may utilize an aqueous alkaline electrolyte, which may be nonflammable. The energy storage device may utilize organic material(s) as the negative electrode, such as, but not limited to, poly(anthraquinonyl sulfide) (PAQS), organic carbonyl compounds, organosulfur compounds, redox polymers, or radical polymers.

14 Claims, 8 Drawing Sheets

RECHARGEABLE ALKALINE BATTERY USING ORGANIC MATERIALS AS NEGATIVE ELECTRODES

RELATED APPLICATIONS

This application is a divisional application of U.S. application Ser. No. 14/825,802 filed Aug. 13, 2015, which claims the benefit of U.S. Provisional Patent Application No. 62/036,828 filed on Aug. 13, 2014, which is incorporated herein by reference.

STATEMENT REGARDING FEDERALLY SPONSORED RESEARCH

This invention was made with government support under Grant No. DE-AR0000380 from Advanced Research Projects Agency-Energy (ARPA-E) within the U.S. Department of Energy. The government has certain rights in the invention.

FIELD OF THE INVENTION

This invention relates to a rechargeable alkaline battery. More particularly, to a rechargeable alkaline battery utilizing organic materials.

BACKGROUND OF INVENTION

Alkaline batteries that use low-cost, nonflammable aqueous electrolyte offer a significant advantage over organic electrolyte based batteries in terms of safety, flexibility in vehicle design and system cost reduction. For example, nickel/metal hydride (Ni-MH or NiMH) batteries are rechargeable alkaline batteries that have been widely used in electric vehicles (EVs) and hybrid electric vehicles (HEVs), such as the Toyota Prius®. NiMH use positive electrodes of nickel hydroxide ($Ni(OH)_2$), like NiCd, but the negative electrodes use a hydrogen-absorbing alloy instead of cadmium. A NiMH battery can have two to three times the capacity of an equivalent size NiCd, and their energy density approaches that of a lithium-ion cell. However, the Ni-MH battery technology currently has two drawbacks. The first problem is its high cost per kilowatthour (kWh). The hydrogen-absorbing alloy used as the negative electrodes contains rare earth metals. There is growing concern that the world may soon face a shortage of the rare earth metals due to the scarcity of rare earth elements, which makes the whole battery expensive and limits the large-scale adoption of Ni-MH for EVs. The second problem is the high self-discharge issue and poor low-temperature performance, which is intrinsically related to the hydrogen-absorbing alloys used in the negative electrode. The metal hydride (MH) electrode needs to maintain certain $H_2$ pressure, which could lead to the issue of high self discharge. The poor low-temperature performance of NiMH is also rooted from the slow diffusion of hydrogen atoms at low temperatures.

It is desirable to have improved alkaline batteries that address these abovementioned drawbacks.

SUMMARY OF INVENTION

In one embodiment, an energy storage device may provide a positive electrode, an electrolyte, and a negative electrode. In some embodiments, the energy storage device may utilize an alkaline electrolyte. In some embodiments, the electrolyte may be aqueous. In some embodiments, the electrolyte may be nonflammable. In some embodiments, the electrolyte may have a pH value no lower than 14. In some embodiments, the energy storage device may utilize an organic material as the negative electrode, such as, but not limited to, poly(anthraquinonyl sulfide) (PAQS), organic carbonyl compounds, organosulfur compounds, redox polymers, or radical polymers. In some embodiments, the negative electrode may be an organic carbonyl polymer. In some embodiments, the negative electrode may be formed from poly(anthraquinonyl sulfide) (PAQS).

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
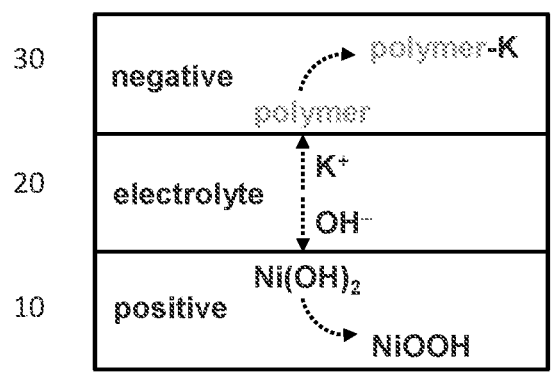
FIG. 1 illustrates the working mechanism of an alkaline battery with polymer as the negative electrode material (where $K^+$ is an embodiment of possible electrolyte cations).

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The invention is a departure from currently available nickel/metal hydride (Ni-MH or NiMH) technology and represents a significant change to the performance of the current state-of-the-art energy storage solutions. As a nonlimiting example, the energy storage solutions discussed herein may be utilized for electric vehicle (EV) applications, which may include fully electric vehicles and hybrid electric vehicles. The energy storage solutions discussed herein offer low-cost materials to replace the hydrogen-absorbing alloys currently used in alkaline batteries without losing the benefits of alkaline batteries discussed previously above. The energy storage systems and methods discussed herein may comprise a secondary battery with (1) aqueous alkaline electrolyte, and (2) organic materials as the negative electrode. The aqueous alkaline electrolyte may be nonflammable or fire-resistant. Energy storage systems and methods discussed herein offer a rechargeable alkaline battery that uses organic materials to replace hydrogen-absorbing alloys in negative electrodes currently used in NiMH. This energy storage systems and methods may increase the viability of aqueous Ni-MH batteries by providing much cheaper materials to reduce the high cost of metal hydrides (MHs) due to the rare earth metals. Further, these energy storage systems and methods may address the self-discharge and poor low temperature performance issues of currently available NiMHs. The intrinsic safety of utilizing aqueous electrolyte adds to the flexibility in packaging battery system for electric vehicles (EVs).

Energy storage systems and methods may use organic electrode materials (OEMs) as one example to illustrate the ability of organic materials, to be potentially sustainable, low-cost, and high-energy electrode materials. By replacing hydrogen-absorbing alloys with OEMs, the two drawbacks currently facing Ni-MH batteries could be completely eliminated.

There are specific requirements for OEMs to work in alkaline electrolytes that differentiate from other potential aqueous battery technologies. OEMs in an alkaline battery must be sufficiently chemically inert to survive the nucleophilic alkaline electrolytes (pH≥14). The low oxygen evolution potential for the positive electrode requires correspondingly low reduction potential (e.g. ≤−0.4 V vs Ag/AgCl) for OEM negative electrodes to ensure a reasonably high full cell potential. These requirements are electrolyte-specific and separate the OEMs disclosed herein from those proposed for other aqueous batteries.

Figure 2:
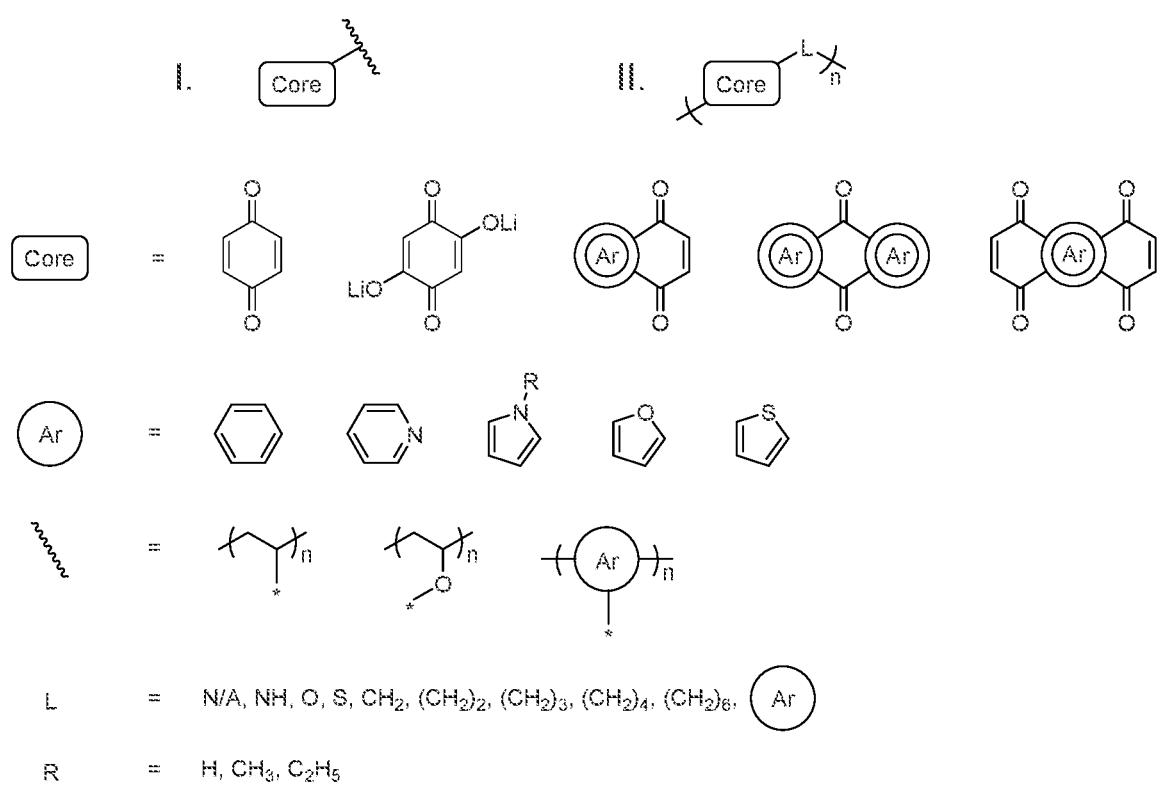
FIG. 2 shows illustrative embodiment of the structures of polymers that can be used as the negative electrode materials for the disclosed alkaline batteries.

FIG. 1 is an illustrative embodiment of an alkaline battery comprising a positive electrode 10, electrolyte 20, and a negative electrode 30. As a nonlimiting example, the positive electrode of the alkaline battery may be made of $Ni(OH)_2$, NiOOH, $Mn(OH)_2$, MnOOH, air electrode, or any other suitable materials. As a nonlimiting example, the negative electrode may be made of organic carbonyl compounds, organosulfur compounds, redox polymers, radical polymers, or any suitable organic electrode material, all of which do not contain a transition metal. In some embodiments, the negative electrode may be an organic carbonyl polymer. FIG. 2 shows further nonlimiting examples of OEM structures that may be used as the negative electrode. The structures are polymers comprising the redox active Core structures and suitable linkers. The Core structures are combinations of carbonyl groups and conjugated structures including, but not limited to, carbon-carbon double bonds and aromatic rings. In some embodiments, Cores are connected to a polymer backbone via carbon-carbon single bond and carbon-oxygen single bond. Backbones can be π-conjugated or non-conjugated. In some embodiments, Cores are directly connected to each other via carbon-carbon single bond. In some embodiments, Cores are directly connected to each other via through simple moieties including but not limited to single atoms, short alkyl chains, and aromatic rings. In some embodiments, the negative electrode may be formed from poly(anthraquinonyl sulfide) (PAQS).

As a nonlimiting example, the electrolyte may be made of any suitable aqueous alkaline electrolyte material, such as 8 M KOH. In some embodiments, the electrolyte may be nonflammable. In some embodiments, the electrolyte may have a pH value equal to or greater than 14. In some embodiments, the aqueous electrolyte may be a 1-10 M solution of MOH (M=Li, Na, K).

Figure 3:
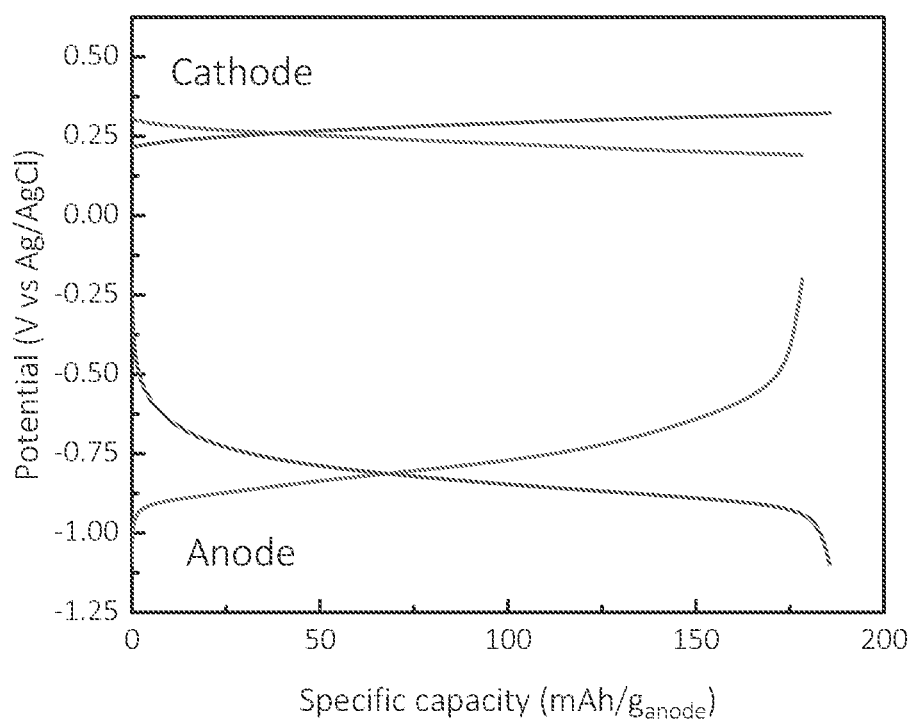
FIG. 3 shows the voltage profiles of a positive and a negative electrode in an embodiment of an organic negative electrode alkaline battery.

In some embodiments, the batteries discussed herein have specific capacity of 150 mAh/g or greater. In some embodiments, the batteries discussed herein have specific capacity of 165 mAh/g or greater. In some embodiments, the batteries discussed herein have specific capacity of 180 mAh/g or greater. In some embodiments, the batteries discussed herein have 60% or greater capacity retention after 100 cycles at 1 C rate. In some embodiments, the batteries discussed herein have 70% or greater capacity retention after 100 cycles at 1 C rate. In some embodiments, the batteries discussed herein have a Coulombic efficiency of 85% or greater after 100 cycles at C/2 rate As an illustrative embodiment, the battery may be formed by mixing an organic material with a conducting agent and a polymer binder to form a mixture, and pressing the mixture into a mesh or perforated foil to form a negative electrode. Next, a metal hydroxide may be pressed into a positive electrode, and a fiber paper may be wetted with an aqueous alkaline electrolyte and placed between the positive and negative electrode. As a nonlimiting example, a mixture of PAQS (70 wt. %), Super-P carbon (20 wt. %), and polytetrafluoroethylene (10 wt. %) was pressed into a stainless steel mesh (other embodiments may utilize a perforated foil) to form the negative electrode. A mixture of CoO-coated $Ni(OH)_2$ (90 wt. %) and polytetrafluoroethylene (10 wt. %) was pressed into another nickel foam serving as the positive electrode. A glass fiber paper wet with an aqueous solution of KOH (8 M) was placed between the positive electrode and the negative electrode. Three-electrode coin cells were fabricated to demonstrate an average reduction potential of −0.80 V vs Ag/AgCl for PAQS and an average reduction potential of 0.25 V vs Ag/AgCl for $Ni(OH)_2$ (FIG. 3).

Figure 4:
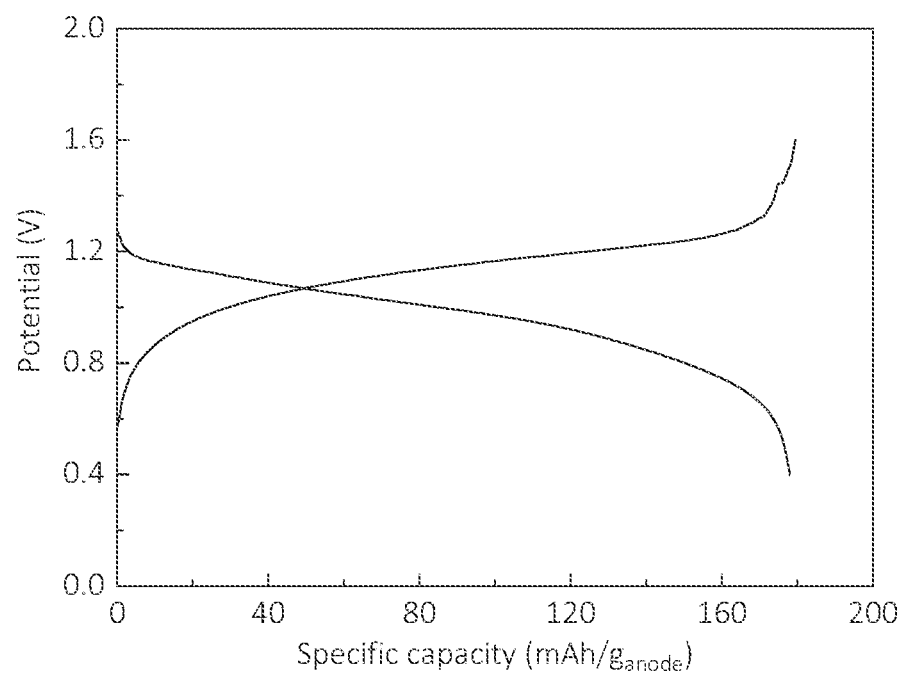
FIG. 4 shows the voltage profile of an embodiment of an organic negative electrode alkaline battery with a capacity per area of 6.5 $mAh/cm^2$.
Figure 5:
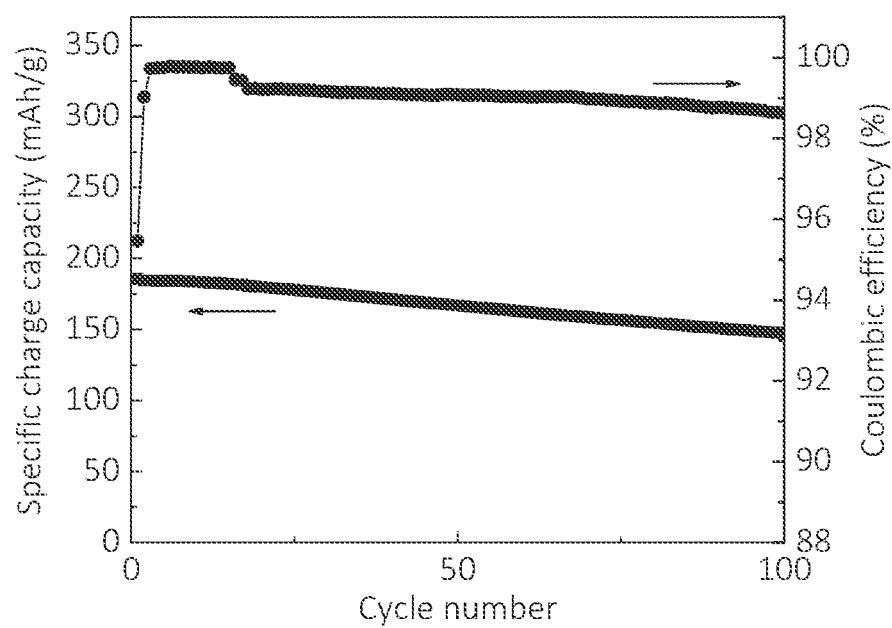
FIG. 5 shows the cycling performance of a polymer negative electrode in an alkaline electrolyte.
Figure 6:
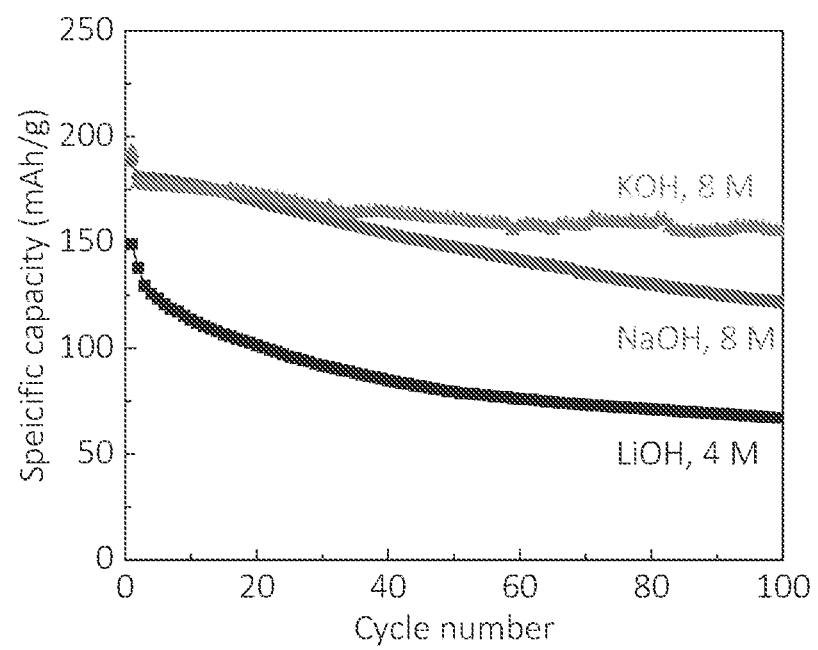
FIG. 6 shows the cycling performance of a polymer negative electrode in alkaline electrolytes containing different metal cations.
Figure 7:
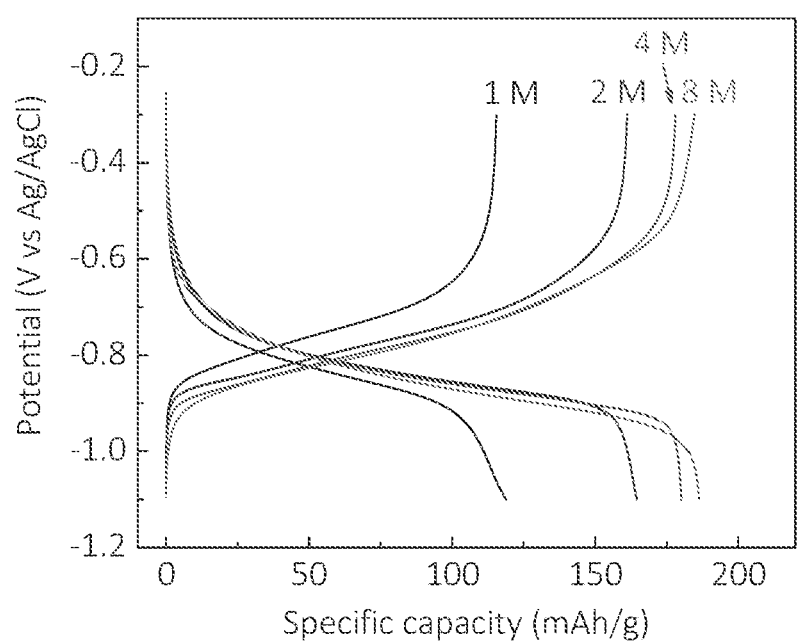
FIG. 7 shows the voltage profile of a polymer negative electrode in alkaline electrolytes with different concentration of base.
Figure 8:
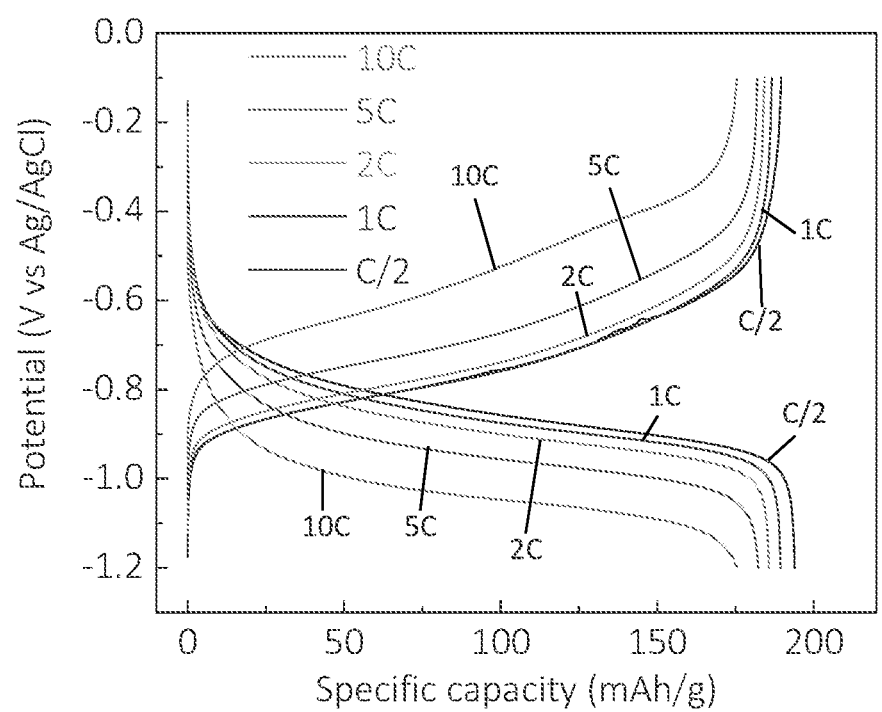
FIG. 8 shows the rate performance of a polymer negative electrode in an alkaline electrolyte.

FIG. 4 shows charge and discharge voltage profiles of a nickel hydroxide-polymer cell. The battery charges from 0.8 to 1.3 V and discharges from 1.3 to 0.8 V with the average discharge voltage around 1.0 V. The PAQS negative electrode shows initial specific capacity of 180 mAh/g at high areal capacity density of 6.5 mAh/$cm^2$. FIG. 5 shows cycling stability of a nickel hydroxide-polymer cell at 1 C. The axis on the left shows the specific capacity. The axis on the right shows the Coulombic efficiency. The PAQS negative electrode shows initial specific capacity of 185 mAh/g and 80% capacity retention after 100 cycles. The mass loading is 6 mAh/$cm^2$. The Coulombic efficiency increases to 99.7% in the first few cycles then gradually decreases to 98.7% in later cycling. FIG. 6 shows the cycling performance of PAQS in alkaline electrolytes containing different metal cations. The electrode can be cycled regardless of the species of the cations though with different level of stability. FIG. 7 shows that PAQS cycles reversibly in a wide range of concentrations of KOH electrolytes. The high tolerance of the OEM toward the composition of alkaline electrolytes provides enough room for fine-tuning the performance of alkaline batteries. The fast charge/discharge capability of the disclosed batteries will satisfy the high power requirements from transportation applications (FIG. 8).

A new type of rechargeable alkaline battery may use organic materials as the negative electrode. Compared to existing metal hydride (MH) negative electrodes, which contain rare earth materials thus are often expensive, the use of low-cost and earth-abundant organic materials as negative electrode would dramatically reduce the cost of rechargeable alkaline batteries without compromising the performance. In addition, using organic materials as the negative electrode will provide batteries with significant better low-temperature performance and reduce self-discharge compared to existing Ni-MH batteries. This new battery technology is of promise for electric vehicles and hybrid electric vehicles, as well as grid-scale energy storage.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for forming a battery, the method comprising:
mixing an organic material to form a mixture;
forming a negative electrode with the mixture and a mesh or perforated foil, wherein the organic material is an organic redox active material in solid-state form selected from organic carbonyl compounds, organosulfur compounds, redox polymers, or radical polymers, and the negative electrode is formed from at least one organic carbonyl polymer that is not subjected to heating and compression and does not require chemical reaction during electrode fabrication,
wherein further the negative electrode has a reduction potential of no higher than 0.4 V vs Ag/AgCl in alkaline electrolytes, the battery has specific capacity of 150 mAh/g or greater, and the battery has a capacity retention of 80% or greater after 100 cycles/6.5 days;
pressing a metal hydroxide into a positive electrode, wherein the positive electrode has a redox active material in solid-state form;
wetting a fiber paper with an aqueous alkaline electrolyte; and
placing the fiber paper between the positive and negative electrode.

2. The method of claim 1, wherein mixing step involves mixing the organic material with a conducting agent and a polymer binder to form the mixture.

3. The method of claim 2, wherein the organic material is poly(anthraquinonyl sulfide) (55-85 wt. %), the conductive agent is Super-P carbon (10-40 wt. %), and the polymer binder is polytetrafluoroethylene (5-20 wt. %).

4. The method of claim 1, wherein the organic material is selected from organic carbonyl polymers.

5. The method of claim 4, wherein the organic material comprises

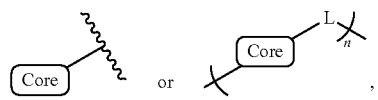

where

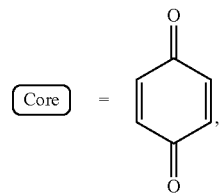

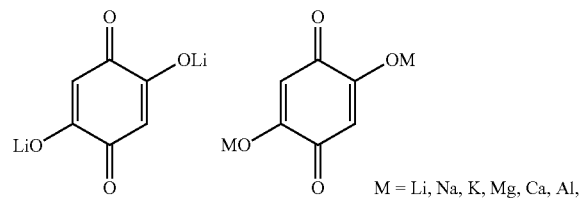

M = Li, Na, K, Mg, Ca, Al,

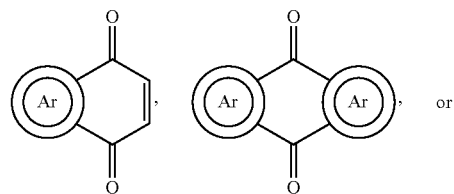

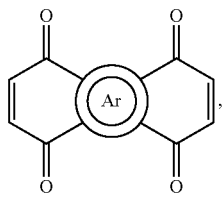

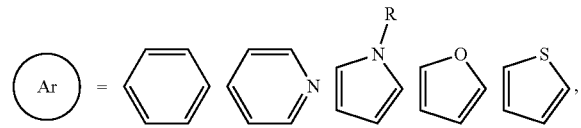

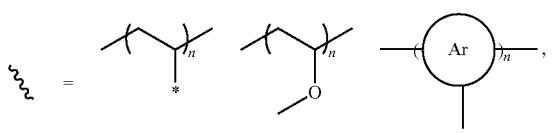

L=N/A, NH, O, S, CH$_2$, (CH$_2$)$_2$, (CH$_2$)$_3$, (CH$_2$)$_4$, (CH$_2$)$_6$, or

and

R=H, CH$_3$, or C$_2$H$_5$.

6. The method of claim 1, wherein the negative electrode is formed from poly(anthraquinonyl sulfide).

7. The method of claim 1, wherein the negative electrode comprises poly(anthraquinonyl sulfide) (55-85 wt. %), Super-P carbon (10-40 wt. %), and polytetrafluoroethylene (5-20 wt. %) pressed into the mesh or the perforated foil.

8. The method of claim 1, wherein the aqueous electrolyte is a 1-10 M solution of MOH (M=Li, Na, K).

9. The method of claim 8, wherein the aqueous electrolyte is 8M KOH.

10. The method of claim 1, wherein the battery has 60% or greater capacity retention after 100 cycles at 1 C rate.

11. The method of claim 1, wherein the battery has a Coulombic efficiency of 85% or greater after 100 cycles at C/2 rate.

12. The method of claim 1, wherein the alkaline electrolyte has a pH≥14.

13. The method of claim 1, wherein the positive electrode comprises CoO-coated Ni(OH)$_2$ and polytetrafluoroethylene.

14. The method of claim 1, wherein the electrolyte is nonflammable.

\* \* \* \* \*